US006335794B1

(12) United States Patent
Herley et al.

(10) Patent No.: US 6,335,794 B1
(45) Date of Patent: Jan. 1, 2002

(54) DETECTION AND DETERRENCE OF COUNTERFEITING OF TWO-SIDED DOCUMENTS

(75) Inventors: Cormac Herley, Los Gatos; Poorvi Vora, Menlo Park, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 9 days.

(21) Appl. No.: 09/220,526

(22) Filed: Dec. 23, 1998

(51) Int. Cl.$^7$ ............................................... G06F 15/00
(52) U.S. Cl. ...................... 358/1.14; 382/151; 382/287; 382/294; 382/306; 283/98
(58) Field of Search ................................ 428/195, 204, 428/206; 283/72, 74, 91, 94, 98; 380/51; 382/135, 151, 100, 170, 184, 287, 291, 294, 295, 306; 358/1.1, 1.12, 1.13, 1.14

(56) References Cited

U.S. PATENT DOCUMENTS

| 4,176,859 A | 12/1979 | Giordano ..................... 283/8 R |
| 5,078,428 A | 1/1992 | Maeno ......................... 283/93 |
| 5,193,853 A | * 3/1993 | Wicker ......................... 283/94 |
| 5,524,933 A | 6/1996 | Kunt et al. .................... 283/67 |
| 5,629,770 A | 5/1997 | Brassil et al. ............. 358/261.1 |
| 5,855,989 A | * 1/1999 | Mantegazza ................ 428/195 |

OTHER PUBLICATIONS

European Patent Search Report Date Apr. 28, 2000.

* cited by examiner

Primary Examiner—Mark Wallerson

(57) ABSTRACT

A method and apparatus is described for detection and deterrence of counterfeiting that permits one to make legitimate copies without introducing substantial visual artifacts or experiencing substantial processing delays by imposing a small, random, offset or jitter into the position upon a page where printing of a copy of a document begins. The jitter makes it extremely unlikely that the registration icons align when the secure document is copied. The misalignment of the icons signal that the copy is a counterfeit. In one implementation, the jitter is always introduced and, in another implementation, jitter is only introduced when counterfeiting is possible, or likely.

16 Claims, 6 Drawing Sheets

DETECTION AND DETERRENCE OF COUNTERFEITING OF TWO-SIDED DOCUMENTS

BACKGROUND OF THE INVENTION

1. Field of the Invention

The present invention relates to printing and, more particularly, to the prevention of printing of counterfeit currency or other documents.

2. Description of the Related Art

Modern technology has made it easy for most people to quickly and inexpensively make accurate color copies of documents. This copying can be achieved through the use of a color copier or by scanning the document and then printing it using a color printer. There are many legitimate uses for this copying technology, however a small percentage of people use color copying to make counterfeit currency or to counterfeit other documents.

One way to prevent counterfeiting is to use techniques such as are taught by Sato, "Color image input apparatus having color image identifying function", U.S. Pat. No. 5,638,496, issued, Jun. 10, 1997. Sato describes a line sensor and image input section that input a color image in a reading area containing an original, an original extracting section that extracts an area of the original from the input image, a normalization section that normalizes an image of the extracted original area to an image of preset size, an image averaging section that converts the normalized image into an averaged image, and a brightness-hue-chroma converting section that converts the averaged image in Vcd images used as color perception amounts of a human being. A pattern matching section collates the Vcd image with dictionary data in a dictionary data storing section to determine whether or not the original is a specified type of original such as a bill, and an image output controlling section then determines whether or not image data output from the color image input section is to be output to the exterior based on the result of the identification.

Thus typical techniques such as searching for a particular pattern or color distribution can be used to detect and stop the copying of a counterfeit document. However, these techniques can be computationally intense and therefore place an undesirable delay on the copying of every document. This delay is particularly undesirable when one realizes that the majority of documents copied are made, not by counterfeiters, but by law-abiding citizens who are copying documents for legitimate purposes.

Thus, it can be seen that current counterfeiting detection and deterrence techniques impose processing delays upon color copying devices, and hinder the use of these devices in many applications.

Therefore, there is an unresolved need for a counterfeiting detection and deterrence technique that permits one to make color copies without imposing processing delays upon color copying devices.

SUMMARY OF THE INVENTION

A method and apparatus is described for detection and deterrence of counterfeiting that permits one to make legitimate copies without introducing substantial visual artifacts or experiencing substantial processing delays. It is possible to include a mated pair of registration icons opposite of each other on opposite sides of a two sided secure document that is likely to be counterfeited. The present invention imposes a small, random, offset or jitter into the position upon a page where printing of a copy of a document will begin. There jitter makes it extremely unlikely that the registration icons will align when the secure document is copied. The misalignment of the icons will signal that the copy is a counterfeit.

For one embodiment, the jitter is always introduced. Alternately, the jitter is only introduced when counterfeiting is possible, or likely.

Our invention has negligible impact on the time to render a page and negligible effect on general images and documents, while generating easily identifiable artifacts on counterfeit copies of two-sided secure documents. The scheme can be deployed in a printer driver with no hardware changes and the conditions determining when the jitter is introduced can be fine-tuned such that the circumstances classified as suspicious can be adjusted to arrive at a compromise that allows reasonable detection, while giving minimal effect on legitimate users.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–9. Those skilled in the art will readily appreciate that the detailed description given herein with respect to these figures is for explanatory purposes, however, because the invention extends beyond these limited embodiments.

If a two-sided document that is to be protected from counterfeiting has any features that depend heavily on accurate alignment of the front and back of the back of the document, then accurate registration when printing a copy becomes very important for the counterfeiter. We propose a simple scheme which makes it difficult for a counterfeiter to achieve absolute registration.

Figure 1:
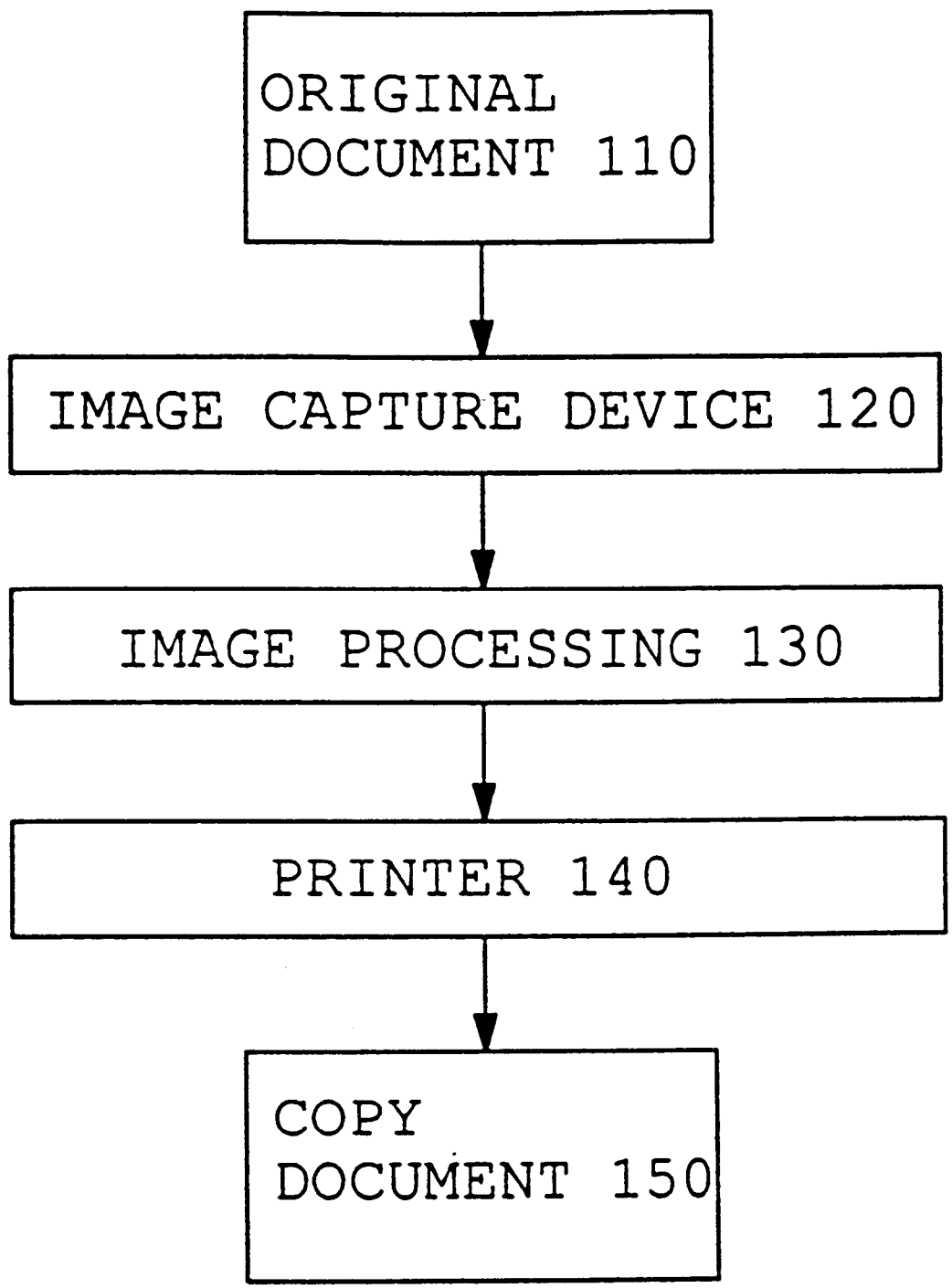
FIG. 1 is a diagram illustrating a color copying system suitable for use with a counterfeiting detection and deterrence scheme according to the present invention.

FIG. 1 is a diagram illustrating a color copying system suitable for use with a counterfeiting detection and deterrence scheme according to the present invention. Image capture device 120 captures an image of original document 110. Image processor 130 processes the image captured by image capture device 120 so that printer 140, can produce copy document 150. As will be explained below in greater detail, image processor 130 has the ability to insert a random offset, or jitter, into the captured image of original document 110. In the event that the document being copied is a two-sided document having registration icons (one on each side), image processor 130 will force a misalignment of the icons when printer 140 produces copy document 150. The jitter-induced misalignment or misregistration will thus identify a copy as being counterfeit.

Certain documents such as banknotes have security features which require very accurate alignment between the front and the back of the note. An example is the Portuguese 1000 escudos note. A portion of a cross is printed on the front, and the remainder on the back. When held to a light source the entire cross becomes visible, and any misalignment of the two halves becomes obvious. For a counterfeiter to produce a good imitation of such a note, he needs to register the front and back very accurately. On a lowcost printer or copier, where the paper will have to be reloaded to print the second side, this can be difficult to achieve. Nonetheless a counterfeiter may with care be able to achieve sufficiently accurate alignment to defeat such a feature.

For one embodiment of the present invention, before beginning rendering, a component of the image processor 130 (such as the print driver) adds a random vertical and horizontal offset to the point on the page (usually upper left corner) where rendering would begin. Thus, if the printer would normally start rendering at location at offset (x, y) from the physical page corner, the printer instead will begin printing at (x+R, y+S) where both R and S are random offset factors. For example, if R and S, were uniformly distributed in the range (−1/16, 1/16) inch, then at 600 dpi, one would have a random jitter of 75 dots in each dimension. This would mean, at worst, a 1/16 inch offset from the desired margin values. If R and S are chosen independently for each page rendered this would mean that the probability of a counterfeiter achieving perfect alignment when printing the second side of a document would be $75^{-2}$ (approx. 0.000178).

A banknote such as the Portuguese 1000 escudos note is an example of a secure document having registration icons. Other examples of two-sided documents that might have a mated pair of registration icons and that may be targets of counterfeiters include: identification cards, bonds, or stock certificates. Note that in some instances, it may be the case that the only thing printed in one side of a document is a registration icon that corresponds to an icon on the other side of the document. Also note that it is possible for the icon to be incorporated in to the document so as to be unnoticeable unless one were looking for it. If fact, it is possible for one side of the document to be a mirror image of the other side. Furthermore, although the secure document will typically have at least one color, it need not. The scheme presented herein will also work to protect black-and-white or gray scale documents.

Image capture device 120, image processor 130 and printer 140 may be separate components as shown in FIG. 1. Image capture device 120 can be a scanner or digital camera, but may also include a device that graphically generates the "captured" image. Image processor 130 can be a dedicated or general purpose computer, and the image processing function can be accomplished by software (for example as a printer driver), by hardware or by firmware. Printer 140 can function by any of a variety of known printing processes using mechanisms such as toner or ink. Alternately, one or more of these components can be combined, for example, as an integral color copier that scans, processes and then prints. Note also that it is possible for the image processing function 130 to be distributed throughout the system. Thus, a portion, or even all, of the image processing function 130 could be accomplished by the image capture device 120 or by the printer 140.

Figure 2:
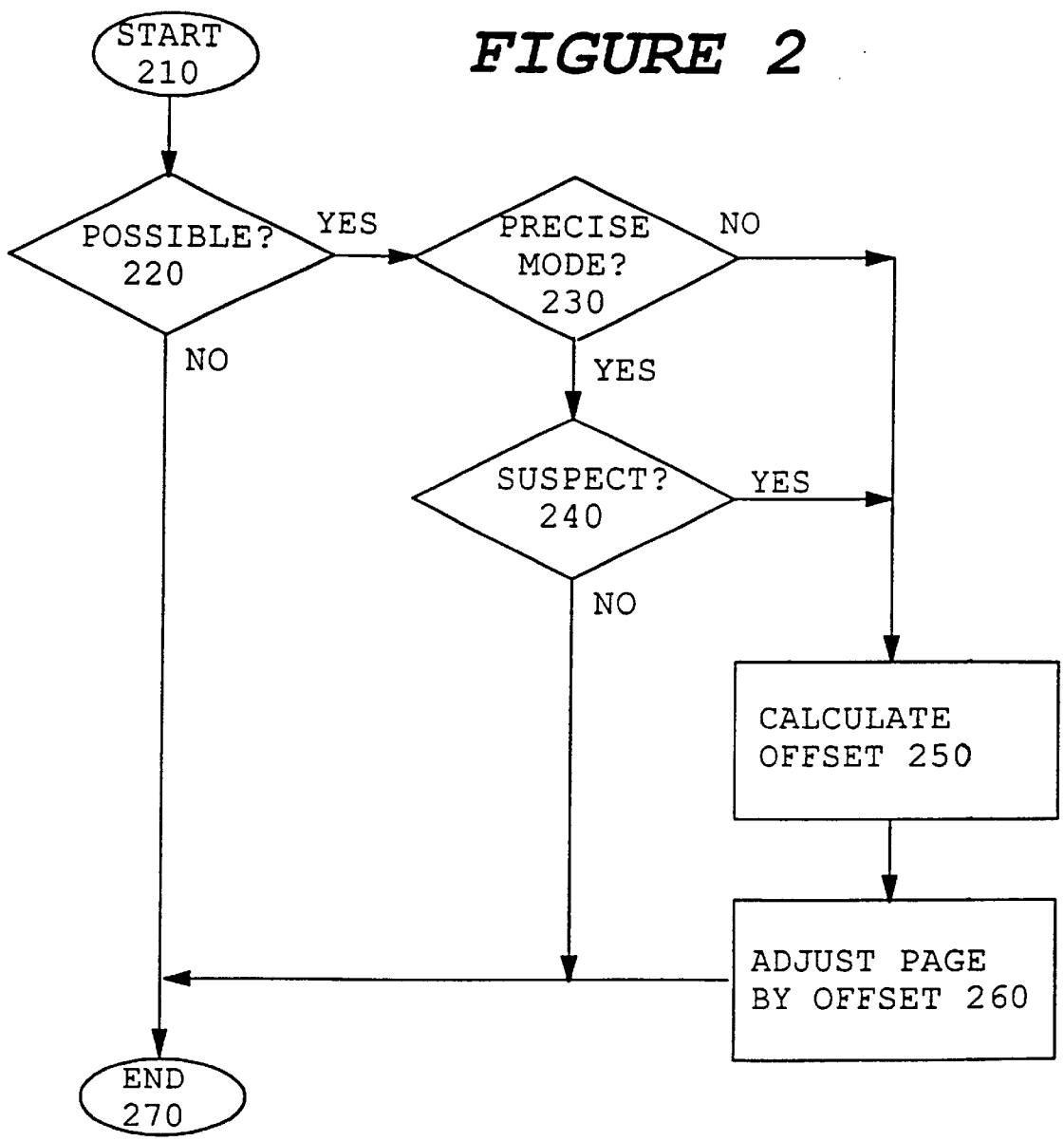
FIG. 2 is a diagram illustrating process flow according to an embodiment of the present invention.

FIG. 2 is a diagram illustrating process flow according to an embodiment of the present invention. The portion of image processing of interest begins at start bubble 210. At decision block 220, a test is made to determine whether or not counterfeiting of a secure document is possible. For example, if it is known that the document being copied is to be printed as a black-and-white or gray scale copy, then it is not possible to generate a counterfeit copy of a document having a characteristic color. This is because the copy will not have the characteristic color, so there would be no chance of confusing the non-colored copy with an original. Therefore, in a case such as just described, to save processing time and to avoid misalignment of two-sided documents under safe printing conditions, there would be no need to introduce a jitter. Note that test 220 is optional and could be eliminated, with the only substantial effect being that a small jitter would occur in every case, with an attendant increase in processing delay.

In decision block 230, a test is performed to determine whether the user has specified a "precise" mode of printing. If a precise mode were specified, say by selecting a print option when printing or copying, then decision 240 would test to determine whether or not the document being printed was being printed under suspicious circumstances that would indicate the likelihood that a counterfeit copy of a secure document was being made. If the precise mode was specified and no suspicious circumstances were detected, then this portion of the processing would terminate at end bubble 270 without introducing a jitter. On the other hand, if a suspicious circumstance was detected, one would calculate an offset (block 250) and then adjust the page to be printed by applying the offset (block 260).

Again note that test 230 is optional and could be eliminated, with the only substantial effect being that a small jitter would occur in every case, with an attendant increase in processing delay.

The advantage of permitting a precise mode is that it would permit the user to make accurate front-to-back registration copies in the case where it was unlikely that a secure copy was being counterfeited. For the majority of users, the introduction of a slight jitter would not present a problem, so they would not use the precise mode when printing. This would permit printing without incurring a processing delay associated with detecting suspicious circumstances that would indicate a likelihood of counterfeiting.

Depending upon how wide a net one wants to cast, one or more tests that are known in the art could be performed to detect suspicious circumstances. An example of a suspicious circumstance that could be detected is a recent history of printing a substantial amount of a characteristic color, such as the "banknote green" found on the back of U.S. currency. Another example, would be to test the image of the document being printed for the presence of an identifying artifact. This identifying artifact could include the presence of the characteristic color, or the presence of a characteristic feature such as a president's face, a treasury seal, or even the registration icon itself.

An example of a scheme that permits quick identification of the use of a characteristic color is described in a separate patent application, C. Herley and X. Yang, "Detection and Deterrence of Counterfeiting of Documents having a Characteristic Color", filed on even date herewith. Using that approach one can count the number of times a region of a color look-up table that corresponds to the characteristic color is accessed, for example when converting pixel values from the RGB color space of a captured image to the CMYK color space used to print the image. Although general images may containing small amounts of a characteristic color, a suspicious circumstance could be detected when a threshold number of pixels access the region of the look-up table associated with the characteristic color.

Note that in the simplest case, decision blocks 220, 230 and 240 would not be included. One would simply calculate an offset (block 250) and then adjust the page to be printed by applying the offset (block 260). For this embodiment the offset would be applied unconditionally to all documents being printed.

Figure 3:
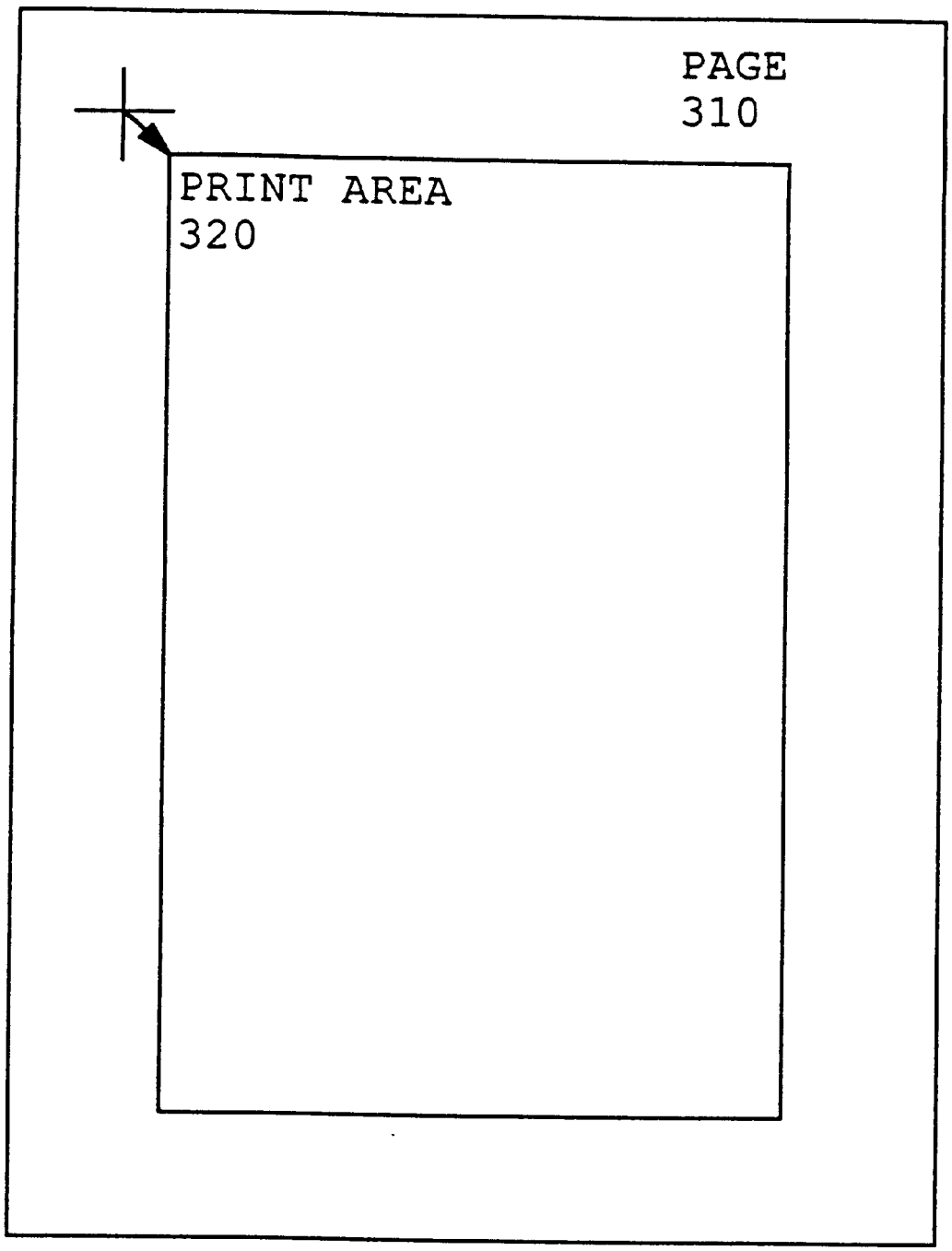
FIG. 3 is a diagram illustrating a printing offset introduced according to an embodiment of the present invention.

FIG. 3 is a diagram illustrating a printing offset introduced according to an embodiment of the present invention. In FIG. 3, the cross hair indicates the position on page 310 where printing of print area 320 would normally begin. The arrow from the center of the cross hair to the upper lefthand corner of print area 320 indicates the offset that has been introduced.

Figure 4:
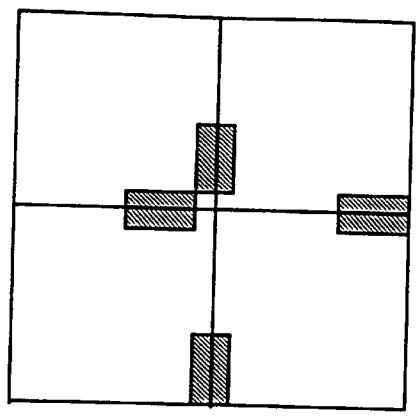
FIG. 4 is a diagram illustrating a first registration icon according to an embodiment of the present invention.
Figure 5:
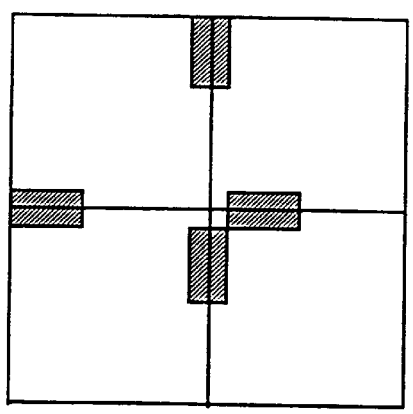
FIG. 5 is a diagram illustrating a second registration icon suitable for use with the first registration icon of FIG. 4 according to an embodiment of the present invention.
Figure 6:
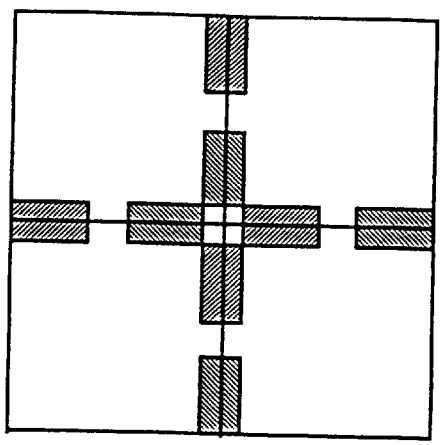
FIG. 6 is a diagram illustrating alignment of the registration icons of FIGS. 4 and 5 when there is proper registration according to an embodiment of the present invention.

FIGS. 4 and 5 are diagrams illustrating examples of first and second registration icons that together form a mated pair according to an embodiment of the present invention. That is to say that icon 400 of FIG. 4 can be included on a first side of a document and icon 500 of FIG. 5 can be included on the other side of the document directly opposite to icon 400. FIG. 6 is a diagram illustrating the pattern 600 formed by alignment of the registration icons of FIGS. 4 and 5 when there is proper registration according to an embodiment of the present invention.

Figure 7:
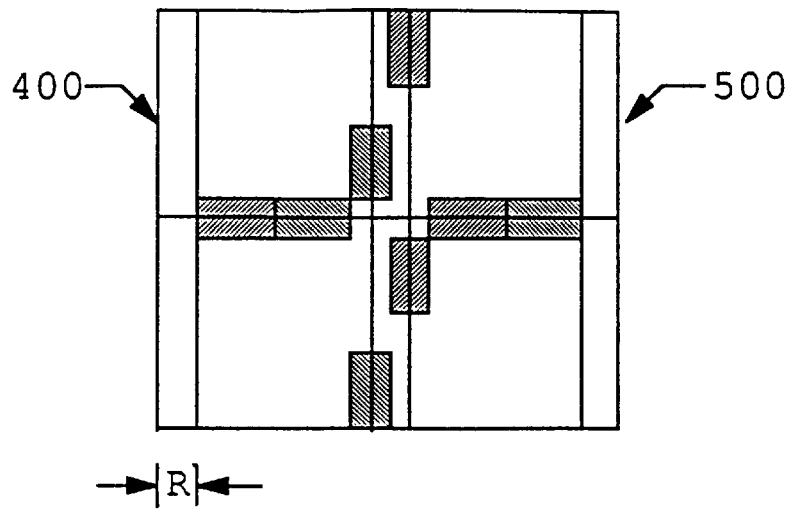
FIG. 7 is a diagram illustrating misalignment of the registration icons of FIGS. 4 and 5 when there is a horizontal offset according to an embodiment of the present invention.

FIG. 7 is a diagram illustrating misalignment of the registration icons of 400 and 500 (of respective FIGS. 4 and 5) when there is a horizontal offset "R" according to an embodiment of the present invention.

Figure 8:
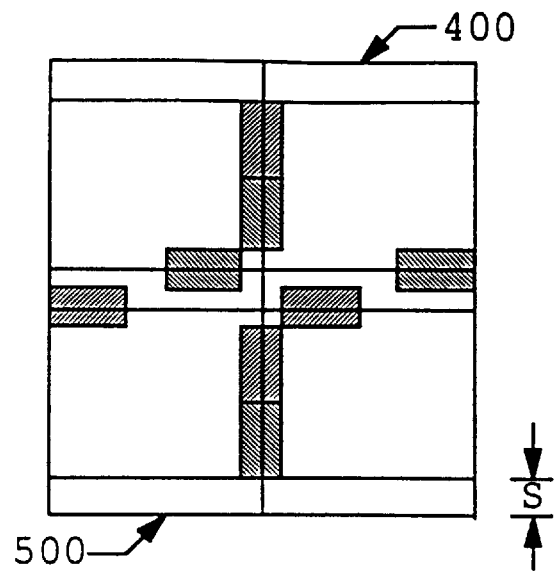
FIG. 8 is a diagram illustrating misalignment of the registration icons of FIGS. 4 and 5 when there is a vertical offset according to an embodiment of the present invention.
Figure 9:
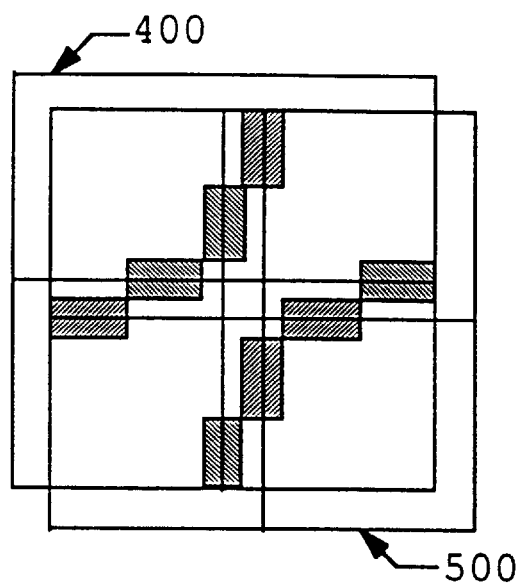
FIG. 9 is a diagram illustrating misalignment of the registration icons of FIGS. 4 and 5 when there are both horizontal and vertical offsets according to an embodiment of the present invention.

Similarly, FIG. 8 is a diagram illustrating misalignment of the registration icons when there is a vertical offset "S" and FIG. 9 is a diagram illustrating misalignment of the registration icons when there are both horizontal and vertical offsets.

It should be obvious that the same registration icons can be applied to a whole page or different icons can be applied to different parts of a page. Similarly, it should be obvious that the introduction of jitter can be applied to a whole page or different jitters can be applied to different parts of a page.

In summary, the advantages of the random jitter introduction scheme presented include:

Virtually no impact on the time to render a page.

Imperceptible impact on the desired margins on a page being printed, while making absolute registration difficult.

Minimal change to driver software, which may involve only the generation of one or two random numbers per page.

Normal users will probably not even suspect that a security feature has been deployed.

It is possible to "retrofit" installed base of printers because drivers are commonly upgraded with operating system upgrades.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An apparatus for deterring counterfeiting of a two-sided secure document having a mated pair of registration icons, the apparatus comprising:

an offset generator adapted to obtain a random offset for a captured image to be printed; and a shifter adapted to apply the random offset to a printed area of a page of a document during rendering of the page, the printed area corresponding to the captured image, the random offset inducing an unpredictable misalignment of a first registration icon of the mated pair captured from a first side of the document to be printed, with a second registration icon of the mated pair being captured from a second side of the document to be printed once the first and second sides of the document is printed.

2. The apparatus as set forth in 1, wherein the offset is a horizontal offset.

3. The apparatus as set forth in 1, wherein the offset is a vertical offset.

4. The apparatus as set forth in 1, wherein the offset is both a horizontal and vertical offset.

5. The apparatus as set forth in 1, comprising a suspicious activity detector adapted to determine if a particular page to be printed is to be printed under suspicious circumstances attendant with counterfeiting of the secure document and to only apply the offset if the suspicious circumstances are detected.

6. The apparatus as set forth in 1, comprising a feasibility detector adapted to determine if a particular page to be printed is to be printed in a way that is possible to print the secure document and to only apply the offset if it is possible to print the secure document.

7. The apparatus as set forth in 1, comprising a printer adapted to print the page to be printed.

8. The apparatus as set forth in 1, comprising a capture device adapted to capture the image of the document to be printed.

9. A method for deterring counterfeiting of a two-sided secure document having a mated pair of registration icons, the method comprising:

obtaining a random offset for a captured image to be printed; and applying the random offset to a printed area of a page of a document during rendering of the page, the printed area corresponding to the captured image, the random offset inducing an unpredictable misalignment of a first registration icon of the mated pair captured from a first side of the document to be printed, with a second registration icon of the mated pair being captured from a second side of the document to be printed once the first and second sides of the document are printed.

10. The method as set forth in 9, wherein the offset is a horizontal offset.

11. The method as set forth in 9, wherein the offset is a vertical offset.

12. The method as set forth in 9, wherein the offset is both a horizontal and vertical offset.

13. The method as set forth in 9, comprising the steps of:
   determining if a particular page to be printed is to be printed under suspicious circumstances attendant with counterfeiting of the secure document; and
   only applying the offset if the suspicious circumstances are detected.

14. The method as set forth in 9, comprising the steps of:
   determining if a particular page to be printed is to be printed in a way that is possible to print the secure document; and
   only applying the offset if it is possible to print the secure document.

15. The method as set forth in 9, comprising the step of printing the page to be printed.

16. The method as set forth in 9, comprising the step of capturing the image of the document to be printed.

* * * * *